(12) United States Patent
Ulman et al.

(10) Patent No.: US 11,252,344 B2
(45) Date of Patent: Feb. 15, 2022

(54) METHOD AND SYSTEM FOR GENERATING MULTIPLE SYNCHRONIZED THERMAL VIDEO STREAMS FOR AUTOMOTIVE SAFETY AND DRIVING SYSTEMS

(71) Applicant: Adasky, Ltd., Yokneam Illit (IL)

(72) Inventors: Sharon Ulman, Kfar Yehoshua (IL); Amotz Katz, Mohave Habonim (IL); Michael Sterin, Rakefet (IL); Offer Livny, Zichron Yaakov (IL); Itamar Arad, Haifa (IL)

(73) Assignee: Adasky, Ltd., Yokneam Illit (IL)

( * ) Notice: Subject to any disclaimer, the term of this patent is extended or adjusted under 35 U.S.C. 154(b) by 0 days.

(21) Appl. No.: 15/961,125

(22) Filed: Apr. 24, 2018

(65) Prior Publication Data

US 2019/0199943 A1   Jun. 27, 2019

Related U.S. Application Data

(60) Provisional application No. 62/610,735, filed on Dec. 27, 2017.

(51) Int. Cl.
| | |
|---|---|
| *H04N 5/217* | (2011.01) |
| *H04N 5/357* | (2011.01) |
| *H04N 5/33* | (2006.01) |
| *H04N 5/265* | (2006.01) |

(52) U.S. Cl.
CPC ............. *H04N 5/332* (2013.01); *H04N 5/217* (2013.01); *H04N 5/265* (2013.01)

(58) Field of Classification Search
CPC .. G01J 5/025; H04N 5/03; H04N 5/33; H04N 5/332; H04N 5/217; H04N 5/265; G06T 5/00

USPC .......................................... 348/164; 382/254
See application file for complete search history.

(56) References Cited

U.S. PATENT DOCUMENTS

| | | | |
|---|---|---|---|
| 5,623,483 A | 4/1997 | Agrawal et al. | |
| 6,041,067 A | 3/2000 | Takamori et al. | |
| 6,629,318 B1 | 9/2003 | Radha et al. | |
| 7,548,586 B1 | 6/2009 | Mimar | |
| 7,881,495 B2 * | 2/2011 | Williams | F41G 7/2226 382/103 |
| 2004/0117858 A1 | 6/2004 | Boudreau et al. | |
| 2012/0092443 A1 | 4/2012 | Mauchly | |
| 2013/0141643 A1 | 6/2013 | Carson et al. | |
| 2014/0270563 A1 * | 9/2014 | Bailey | H04N 5/33 382/254 |
| 2015/0281749 A1 * | 10/2015 | Hutchison | G01J 5/025 348/164 |
| 2017/0230591 A1 * | 8/2017 | Christison | H04N 5/33 |
| 2018/0262740 A1 * | 9/2018 | Ross | G01S 17/87 |
| 2020/0154063 A1 * | 5/2020 | Kostrzewa | H04N 5/33 |

* cited by examiner

*Primary Examiner* — Albert Kir
(74) *Attorney, Agent, or Firm* — M&B IP Analysts, LLC

(57) ABSTRACT

A system and method for image stream synchronization for an FIR camera. The method includes applying an initial correction to a received image stream; splitting the corrected image stream into a first image stream and at least a second image stream; enhancing the first image stream by at least one image enhancing process; buffering the second image stream until a synchronization signal is received; and synchronizing the first image stream and second image stream, such that the output of the enhanced first image stream and the buffered second image stream match.

15 Claims, 5 Drawing Sheets

METHOD AND SYSTEM FOR GENERATING MULTIPLE SYNCHRONIZED THERMAL VIDEO STREAMS FOR AUTOMOTIVE SAFETY AND DRIVING SYSTEMS

CROSS-REFERENCE TO RELATED APPLICATIONS

This application claims the benefit of U.S. Provisional Application No. 62/610,735 filed on Dec. 27, 2017, the contents of which are hereby incorporated by reference.

TECHNICAL FIELD

The present disclosure relates generally to automotive safety systems and, more specifically, to the use of two synchronized streams produced from a far-infrared (FIR) camera to efficiently analyze an image data stream.

BACKGROUND

Thermal infrared (IR) cameras capture image wavelengths in the range of seven and a half to fourteen micrometers. A typical IR camera uses an infrared sensor (or detector) to detect infrared energy that is guided to the sensor through the camera's lens. IR cameras can be utilized for a variety of imaging applications including, but not limited to, passive motion detection, night vision, thermal mapping, health care, building inspection, surveillance, and the like. Recently, an attempt has been made in the IR industry to integrate IR cameras into advanced driver assistance systems and autonomous vehicle systems.

The application, and hence the type of camera, may depend on the infrared spectrum used. The infrared spectrum lies outside the visible light range and consists of a near infrared section (NIR), with wavelengths of 0.75-1.0 micrometers ($\mu$m); a short-infrared section (SWIR) with wavelengths of 1.0-3.0 micrometers ($\mu$m); a mid-infrared section (MIR), with wavelengths of 3.0-5.0 $\mu$m; and a far-infrared (FIR) section, with wavelengths of 7.0-14.0 $\mu$m.

One type of FIR sensor is an uncooled sensor having a small form factor. Such sensors can typically be mass-produced using low-cost technology. In a typical arrangement, an uncooled sensor does not require a cryocooler for proper operation but does require a shutter for frequent calibration. A shutter is a mechanical element placed between the lens and the FIR sensor for alternately blocking and exposing the sensor to infrared wavelengths. Generally, a shutter includes a flat-bladed flag, a sleeve, and an arm that connects the sleeve to the flag. The flag opens and closes at predefined time intervals.

While using a shutter may improve the quality and accuracy of the thermal image captured by an FIR sensor, having a blackout period of hundreds of milliseconds is not acceptable in certain applications. For example, using a shutter-based FIR camera in advanced driver assistance systems and autonomous vehicle systems can pose a high risk, as the camera must frequently shut off for hundreds of milliseconds at a time. In addition, shutters include moving parts that wear out over time. This may cause a camera malfunction during use and shorten the life time of the camera.

Additionally, the image stream captured from the FIR sensor should be enhanced, including reducing unwanted noise and artifacts, adjusting contrast and brightness, and removing bad pixels. When used for advanced driver assistance (ADA) applications and systems, the image stream is further analyzed to detect areas and objects of interest within each frame, highlight relevant objects and areas, such as draw a bounding box around such an object or area, detect roadways, vehicles, and pedestrians, recognize stationary objects, and the like. This analysis requires additional computational resources and can cause latency issues with the image stream. An FIR system that both enhances the image stream and analyzes the contents therein may suffer from decreased performance, resulting in an image with lag unacceptable for ADA applications.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for synchronizing a plurality of image streams output by a far-infrared (FIR) camera. The method includes: applying an initial correction to a received image stream; splitting the corrected image stream into a first image stream and at least a second image stream; enhancing the first image stream by at least one image enhancing process; buffering the second image stream until a synchronization signal is received; and synchronizing the first image stream and second image stream, such that the output of the enhanced first image stream and the buffered second image stream match Certain embodiments disclosed herein also include an image enhancing processor (IEP), including: a processing circuitry; and a memory, the memory containing instructions that, when executed by the processing circuitry, configure the IEP to: enhance a received first image stream by at least one image enhancing process; and assign a synchronization signal to a frame within the first image stream.

Certain embodiments disclosed herein also include a far-infrared (FIR) camera, including: an FIR sensor; an optical unit; and an integrated circuit (IC), wherein the IC further comprises: a processing circuitry, a shutterless correction processor (SLCP) and an image enhancing processor (IEP); wherein SLCP is configured to apply a flat-field correction without a shutter; and wherein the IEP is configured to: enhance a received first image stream by at least one image enhancing process; and assign a synchronization signal to a frame within the first image stream.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
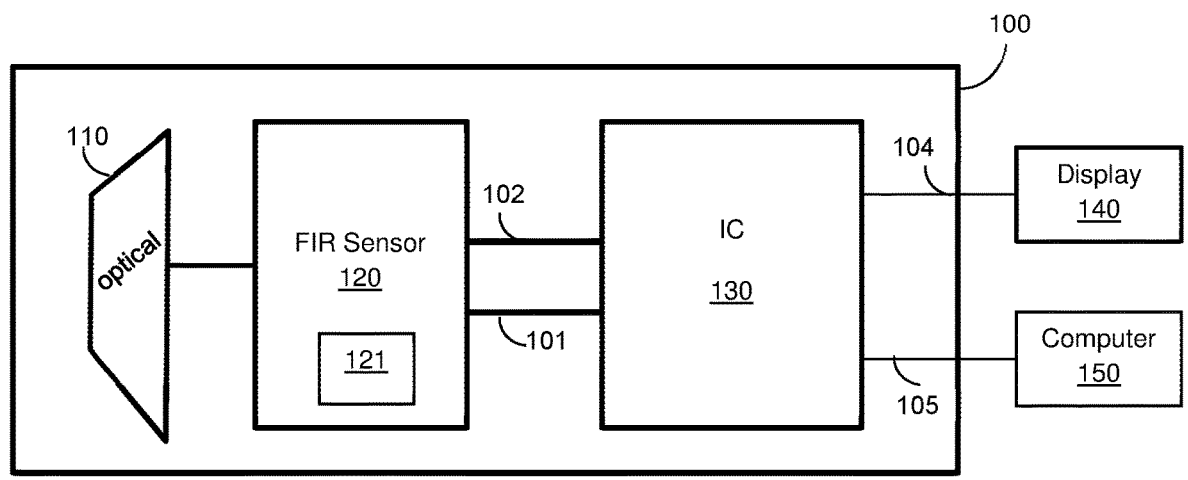
FIG. 1 is an example block diagram of an FIR camera implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example block diagram of an FIR camera 100 implemented according to an embodiment. The FIR camera 100 includes an optical unit 110 and an FIR sensor 120 coupled to an integrated circuit (IC) 130. The output of the FIR camera 100 is a video stream of thermal images (thermal video stream) captured by the FIR sensor 120 and processed by the IC 130.

In an embodiment, two thermal video streams are output by the FIR camera 100. A first stream 104 includes thermal images captured by the FIR sensor 120 and processed by the IC 130 for the shutterless correction and image enhancement. In an example embodiment, the first thermal video stream 104 is an 8-bit grayscale video stream. The first thermal video stream 104 is fed to a display 140 which may be a screen or a dashboard of a vehicle.

A second stream 105 includes thermal images captured by the FIR sensor 120 and processed by the IC 130 for at least shutterless correction. In an example embodiment, the second thermal video stream 105 is a 14-bit data stream. The second stream 105 is fed to a computer 150 for computer vision processing. Specifically, the computer 150 may be configured to execute various computer vision algorithms related to advanced driver assistance (ADA) and autonomous systems and applications. The algorithms may include, but are not limited to, detection of objects, obstacles, or hazards on a road. For example, the processed thermal video stream as output by the FIR camera 100 can be utilized for the detection of vehicles, pedestrians, animals, two-wheelers, black-ice spots, litter, debris, potholes, gully covers, curbs and so on. In an embodiment, the computer 150 may be an onboard vehicle computer or a dedicated computer installed in the vehicle (not shown). In some example embodiments, the computer may be a virtual or physical computing machine operable in a cloud computing platform (not shown).

According to some embodiments, the processing performed by the IC 130 is configured to enhance the quality of the captured thermal images to allow for accurate and fast detection of objects, obstacles, and hazards on the road. The processing by the IC 130 ensures passive detection of objects during day and night lighting conditions and all weather conditions. To this end, the IC 130 is configured to perform one or more image processing tasks. Such tasks include, but are not limited to, shutterless correction, sunburn protection, bad pixel replacement, near field correction, temporal denoising, spatial denoising, edge enhancement, automatic gain control, local contrast, enhancement, and brightness and polarity adjustment. In an embodiment, these tasks are performed in a pipeline manner where some or all the tasks may be utilized to process an FIR image (frame), thus ensuring low latency processing.

An important image processing task performed by the IC 130 is the shutterless correction of FIR images captured by the FIR sensor 120. As demonstrated in FIG. 1, the FIR camera 100 does not include any shutter (or any moving part that can be viewed as shutter). The shutterless correction executed by the IC 130 allows the performance of a flat-field correction without any shutter. That is, shutterless correction allows for a uniform FIR image.

It should be appreciated that the shutterless FIR camera 100 is mechanically reliable and meets safety standards required for ADA and autonomous systems. Further, not using a shutter allows for designing an FIR camera with a small form factor, as there is no need to include moving parts in the design.

In an embodiment, the optical unit 110 includes one or more lens elements, each of which having a predetermined field of view (FOV). In an embodiment, the lens elements are chalcogenide. The lens may be protected by a protective window (not show in FIG. 1). Further, to prevent icing of the optical unit 110 it may be covered by a heating means (not shown in FIG. 1). The heating means may include a wire or a coil.

The FIR sensor 120 is an uncooled FIR sensor. That is, the sensor 120 operates in the FIR (far-infrared) spectrum with a wavelength of 7.5-13.5 μm. In an example, the FIR sensor 120 is coupled through a first bus 101 to the IC 130 to input the captured FIR images and metadata. In an embodiment, a junction temperature sensor (temp sensor) 121 is included in an enclosure of the FIR sensor 120 to measure the junction temperature therein.

A control bus 102 is also connected between the FIR sensor 120 and the IC 130. Signals related to status of the sensor 120, clock, synchronization, and other digital control signals are transferred over the control bus 102. In an embodiment, the control bus 102 may carry analog signals indicating, for example, the current ambient temperature at the FIR sensor 120. Alternatively, the analog signal may not be part of the control bus 102.

Figure 2:
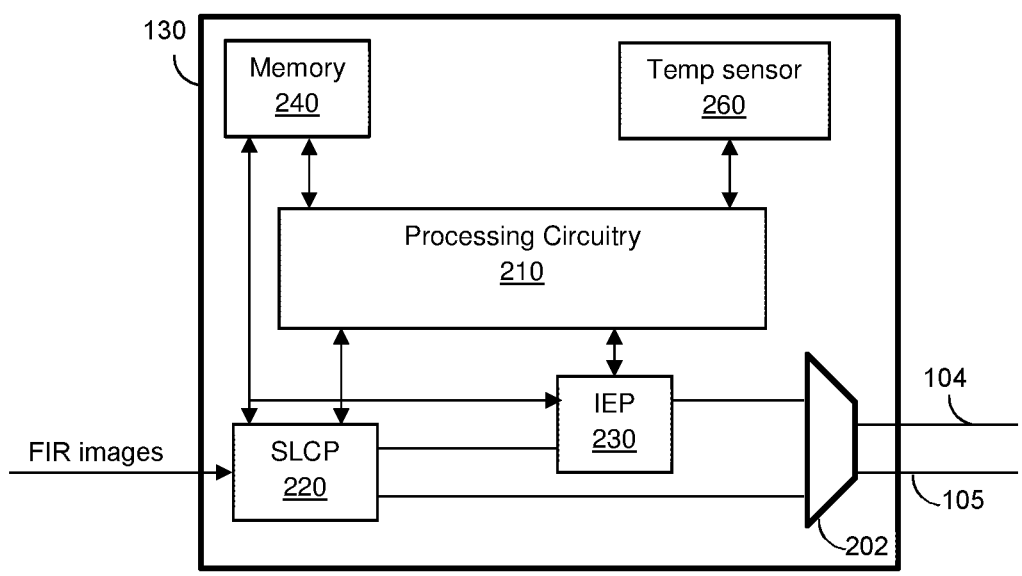
FIG. 2 is an example block diagram of the integrated circuit (IC) designed according to an embodiment.

FIG. 2 is an example block diagram of the IC 130 designed according to an embodiment. The IC 130 includes a processing circuitry 210, a shutterless correction processor (SLCP) 220 and an image enhancing processor (IEP) 230 that are configured to execute the various image processing tasks. The IC 130 further includes a memory 240, and a temperature sensor 260.

The IC 130 interfaces with the external elements, such as the computer 150 and display 140 of FIG. 1, through a multimedia link 202. In an example embodiment, the multimedia link 202 is a gigabit multimedia serial link (GMSL). As noted above, in one embodiment, the IC 130 can be configured to output two thermal video streams of FIR images: a first stream 105 is processed by the SLCP 220 and input to the computer 150, and a second stream 104 is processed by the SLCP 220 and the IEP 230 and input to the display 140. Both thermal video streams are output via the multimedia link 202. In an embodiment, both the first stream 105 and the second stream 104 are output to an external computing unit (ECU), where further image processing is performed before being output to a display. The ECU may be the computer 150 according to an embodiment.

In an embodiment, the memory 240 is configured to store calibration tables. The calibration tables include at least various calibration values for each pixel computed at the lab. The calibration values may include the Gain and Offset calculated from two temperature points ($T_1$, $T_2$) for the purpose of overcoming the irregularities in the FIR sensor and unifying the pixels' response to IR radiation for a wide range of ambient temperatures. The calibration table also includes a drift value determined for each pixel at each temperature point during a calibration process. In an embodiment, the tables also store various parameters' values to set the FIR camera 100.

The memory 240 may further store computer readable instructions to be executed by the processing circuitry 210, the SLCP 220 and the IEP 230. The computer readable instructions shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, the SLCP 220 and/or IEP 230, cause these processors to perform the various embodiments and tasks described herein. The memory 240 may be volatile (e.g., RAM, etc.), non-volatile (e.g., ROM, flash memory, etc.), or a combination thereof.

The processing circuitry 210 is configured to control the various elements of the IC 130. The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In an embodiment, the SLCP 220 is configured to perform at least shutterless pixel-based and scene-based corrections. The pixel-based correction corrects offset, gain and drift for each pixel. In an embodiment, the offset and gain of a pixel are corrected based on the respective values in the calibration table matching a respective temperature as measured by the temperature sensor, e.g., the temp sensor 121 of FIG. 1. This correction compensates for the irregularities in the sensor and unify the pixels' response to IR radiation for a wide range of ambient temperatures.

The SLCP 220 is configured to perform a drift correction, including adding drift correction to each of the pixels. Specifically, correction for each pixel is a subtraction of a product of a pre-defined drift value provided from a loaded calibration table separately for each pixel and a gamma value which is calculated from the frames produced by the FIR sensor. The pre-defined drift value is selected from a table based on the current measured temperature at the FIR sensor 121.

In an embodiment, the scene-based correction includes removing fixed noise patterns. Such a pattern results from a high frequency signal remaining in the processed FIR image after subtracting a low-pass smoothed image from the original image. In a shutterless implementation, the resulted scene is homogeneous, which leads to edges (high-frequency signals) from the actual scene to appear in the obtained noise pattern. This may lead to real edges from the scene being mistakenly classified as noise. To this end, the noise patterns are determined based on image samples in time, and from homogeneous areas in space.

As will be discussed in detailed below, the SLCP 220 implements a plurality of modules to execute required shutterless corrections and other image enhancing tasks. In an embodiment, the scene-based correction also includes correcting pixels that suffer from "sunburn effect." Such an effect is caused by exposing the FIR camera directly to the sun, which brings the exposed pixels into deep saturation. The outcome of this effect is characterized by a ghost footprint of the sun similar to a fixed pattern noise which may last from minutes to weeks, depending on the exposure time. According to the disclosed embodiment, the sunburn correction also removes ghost footprints from the image in a few seconds (e.g., 2-5 seconds).

At minimum, the SLCP 220 is implemented to perform pixel-based shutterless correction, column noise suppression, scene based noise removal, and near field correction. In an embodiment, the SLCP 220 can be configured to perform additional image processing tasks to provide a high-quality thermal video stream that would allow for accurate detection of objects. The image processing tasks are performed in a pipeline manner by the various modules via the SLPC 220 and the IEP 230, as described and illustrated in FIG. 3.

The bad pixel mask (BPM) module 301 masks pixels designed in a bad pixel map. Such pixels do not meet the basic quality requirements as required by a manufacture of the FIR sensor. The bad pixels in the map can be identified by the manufacture or during a test performed on the FIR sensor at the lab. The bad pixel map is saved in the memory 240. The sunburn detection module 302 detects pixels that suffer from sunburn, i.e., pixels that are exposed to deep saturation.

The pixel-based shutterless correction (PBSC) module 303 performs correction of the offset, gain and drift value for each pixel as discussed above. The column noise suppression (CNS) module 304 suppresses fixed pattern column noise in the FIR image capture by the FIR sensor. The bad pixel correction (BPC) module 305 attempts to correct bad pixels by approximating each bad pixel using an optimal interpolation based on the pixel predefined number (e.g., 8) of its closest neighboring pixels.

The near field correction (NFC) module 306 corrects undesired patterns superimposed on the scene image by various physical effects, such as reflections of the camera case and lens. Such patterns are modeled during the calibration mode. During the operational mode, the NFC module 306 identifies a best fit between the pattern and the input image and subtracts the pattern from the image accordingly. The NFC module 306 handles two such patterns either independently or as a linear combination. The required pattern images and parameters are provided by the processing circuitry 210 at power up and are updated when necessary.

The scene based noise removal (SBNR) module 307 performs the shutterless scene-based and sunburn correction tasks discussed above. The SBNR module 307 is required for a proper shutterless operation. The h-flip module 308 implements horizontal flip of the received sensor image. In an embodiment, the h-flip module 308 is further configured to clip the pixels' values between minimum and maximum values. These values are pre-configured.

The time denoise module (TDM) 309 implements a process for time denoising of infrared video. The video obtained from the FIR sensor contains temporal noise of varying types, such as white noise, salt and pepper noise (occasional flickering) and row/columns noise. In an embodiment, the time denoise module 309 is realized by an IIR filter with an adaptive threshold, and an anti-flickering mechanism. The time denoise module 309 compares the changes in pixel values from frame to frame to the estimated noise variance, to decide whether such values are caused by noise or by some actual change in the scenery. Based on the comparison, a signal to noise ratio is determined.

The spatial denoise module (SPD) 310 is configured to denoise spatial noise. Such noise is caused due to internal electronic noise, errors in the pixel gains and offsets and drifts caused by temperature fluctuations. In an embodiment, the SPD module 310 replaces each noisy pixel by a weighted average of neighboring pixels. In an embodiment, only pixels having a gray level that is closer to a predefined gray level threshold are replaced.

In an example embodiment, the output of the spatial denoise module 310 is a 14-bit grayscale video stream fed to the computer 140 (FIG. 1) and the IEP 230.

It should be noted that in certain configurations only some of the modules described are required as part of the processing. The various parameters, maps, and calibration values are not required to operate the various modules and processes stored in the memory 240 and are not illustrated herein merely for the sake of simplicity.

Returning to FIG. 2, the IEP 230 processes the 14-bit stream to produce an enhanced thermal video stream that can be seen by a human. In an embodiment, the IEP 230 converts the 14-bit stream to a high quality 8-bit stream that can be efficiently displayed on a screen.

Figure 3:
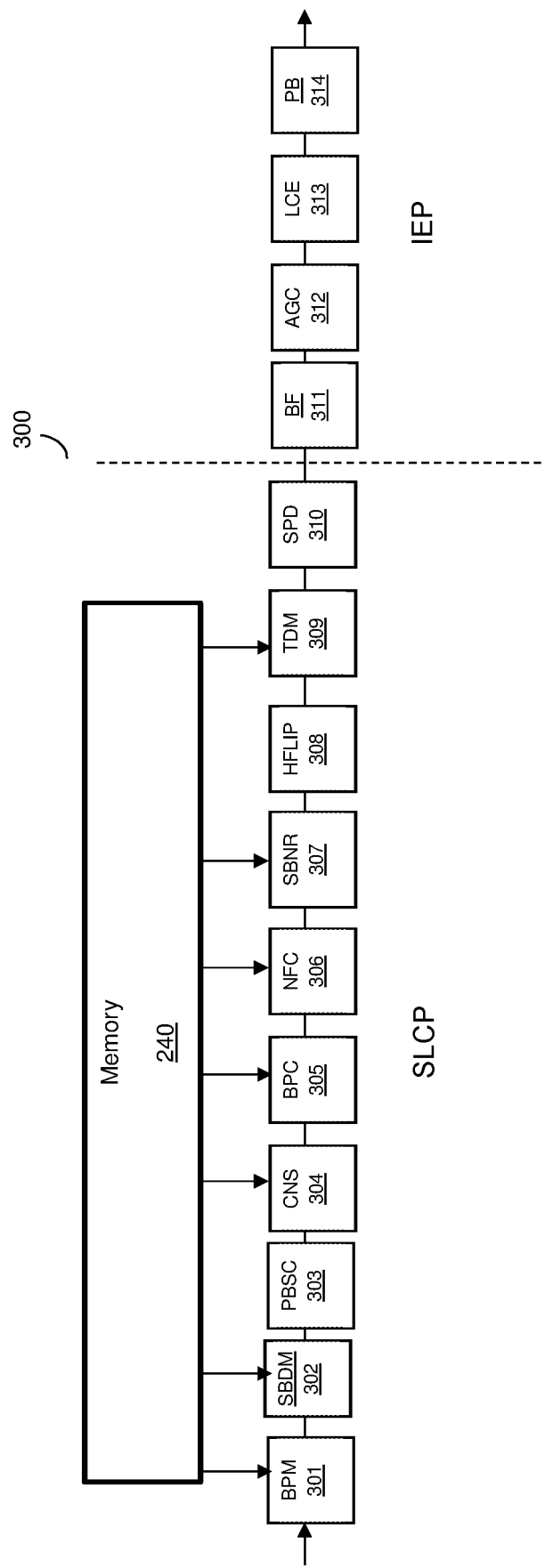
FIG. 3 illustrates a pipeline of processing tasks performed by the IC of FIG. 2 according to an embodiment.

In an embodiment, the IEP 230 includes modules, shown in FIG. 3, that perform image enhancement processes. The first IEP module is a bilateral filter (BF) 311 utilized for edge preserving and noise reduction. The automatic gain control (AGC) module 312 is configured to reduce the influence of empty bins from the gray level range. That is, the AGC module 312 is configured to reduce the distance between the lowest and the highest gray levels in the image to a minimum without essentially losing information. The dynamic range reduction allows for stretching the image histogram as much as possible.

The local contrast enhancement (LCE) module 313 implements a process for contrast limited adaptive histogram equalization (CLAHE). In image processing, contrast limited adaptive histogram equalization is a technique used to improve the local contrast of an image. The adaptive histogram equalization is performed to find the mapping for each pixel based on its local (neighborhood) grayscale distribution.

In an embodiment, the LCE module 313 is configured to divide the image into overlapping blocks to reduce even more the blocking effect. In some cases, when grayscale distribution is highly localized, it may not be desirable to transform very low-contrast images by full histogram equalization. In such cases, the mapping curve may include segments with high slopes, meaning that two very close grayscales might be mapped to significantly different grayscales. This is resolved by limiting the contrast that is allowed through histogram equalization.

The last image processing enhancement module is the polarity-and-brightness (PB) module 314. In an embodiment, the PB module 314 changes between white-hot and black-hot pixels and adjusts the brightness of the image's pixels by a predefined offset.

It should be noted that the processing of the various modules shown in FIG. 3 is performed on infrared images input by the FIR sensors. The resulting images remain infrared images (referred herein as "FIR images"). Thus, the processing does not change the nature of the image (e.g., from an infrared to a visible spectrum image), but rather improves the quality of the infrared image.

Referring back to FIG. 2, the processing circuitry 210 may include a single core or a multi-core CPU. Each of the SLCP 220 and IEP 230 may be realized as one or more hardware logic components and circuits. For example, and without limitation, illustrative types of hardware logic components that can be used include FPGAs, ASICs, ASSPs, SOCs, general-purpose microprocessors, microcontrollers, DSPs, and the like, or any other hardware logic components that can perform calculations or other manipulations of information.

Figure 4:
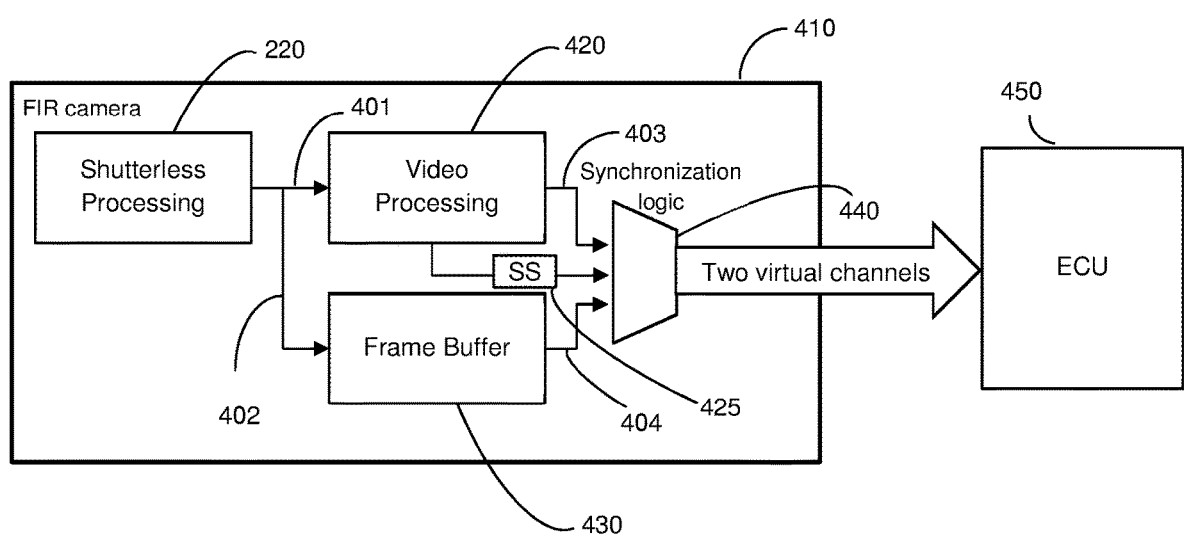
FIG. 4 is a schematic diagram of an FIR camera showing the image enhancing process according to an embodiment.

FIG. 4 is a schematic diagram of the FIR camera 410 showing the image enhancing process according to an embodiment. Thermal images are captured by the FIR sensor of the camera 410 (e.g., the FIR sensor 120, FIG. 1). The captured thermal images are first processed by a shutterless correction processor 220 that is configured to remove unwanted noise and other artifacts from the image stream, as explained above regarding FIGS. 2 and 3. The corrected stream is divided into at least two parallel streams of thermal images. In an example embodiment, a first stream 401 is fed into to a video processor 420 and a second stream 402 is fed into a frame buffer 430. Two streams 403 and 404 are output by the video processor 420 and buffer 430 respectively and may include varying amount of data. In an example embodiment, the first stream 401 includes an 8-bit data stream and the second stream 402 includes a 14-bit data stream.

In an embodiment, the video processor 420 is the image enhancing processor (IEP) of FIG. 2. The video processor 420 is configured to further enhance the image stream beyond the shutterless correction, including implementing a bilateral filter, automatic gain control, local contrast enhancement, and polarity-and-brightness correction, as described above regarding FIG. 3. In an embodiment, the shutterless correction processor 220, the video processor 420, or both are embedded within the FIR camera 410.

To complete the enhancements of the first stream 401, additional computation resources, as well as additional time, is required. As a result, the output first stream 403 from the video processor 420 and the second stream 402 may be out of synchronization. To remedy this, in an embodiment, the second stream 402 is fed into a frame buffer 430 configured to slow down the second stream such that both the first stream 401 and the second stream 402 are output from the FIR camera simultaneously and in synchronization with each other. In an embodiment, the frame buffer 430 is configured to buffer the second stream 402 until a synchronization signal is received from the first stream. For example, the video processor 420 may be configured to assign a synchronization signal 425 to a certain frame within the first stream 401. When the frame connected with the synchronization signal 425 is detected, e.g. by a synchronization logic 440, the second stream is released from the frame buffer 430 at a matching frame. Both streams may be fed to an external computing unit 450 for further analysis, which may include object detection, road classification, area of interest identification, and the like.

The two processed output streams 403 and 404 are fully synchronized. In an embodiment, the two streams are combined into a single virtual stream by the synchronization logic 440 based on the synchronization signal 425. The virtual stream is fed into the external computing unit 450.

Figure 5:
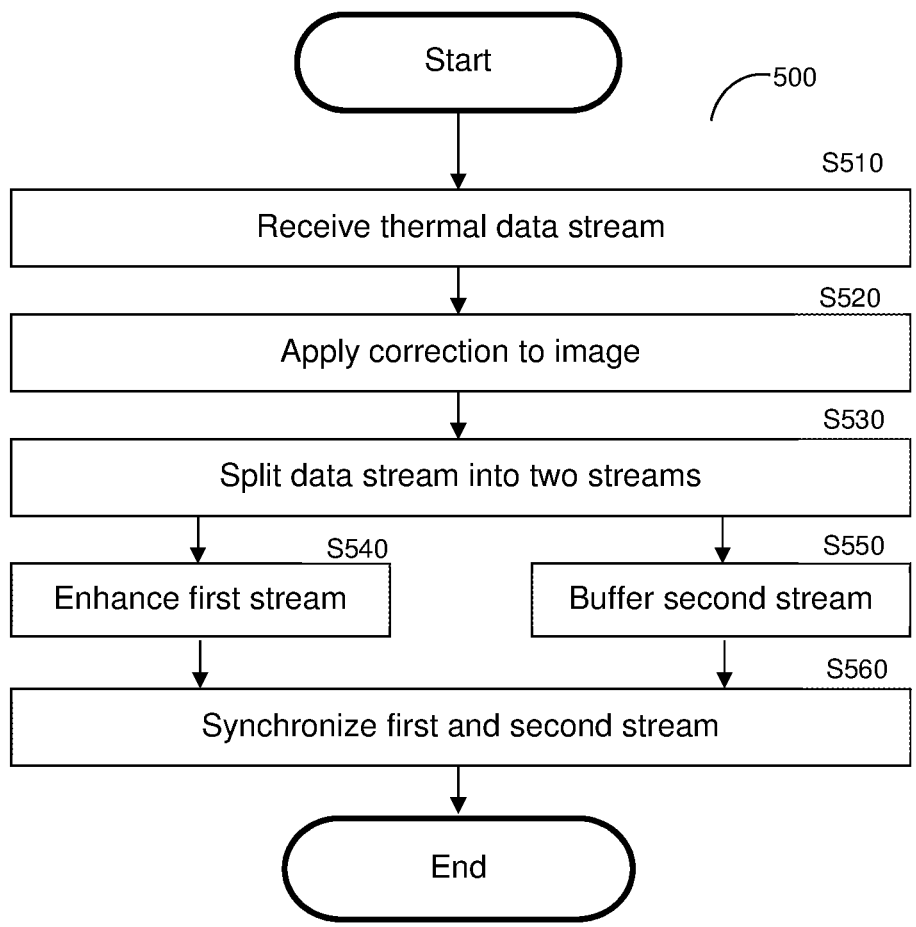
FIG. 5 is a flowchart illustrating a method for image stream synchronization for an FIR camera.

FIG. 5 is an example flowchart 500 illustrating a method for image stream synchronization for an FIR camera according to an embodiment. At S510, a data stream, such as a thermal image stream, is received. The data stream may be received from a camera sensor, e.g., an FIR sensor.

At S520, an initial correction is applied to the data stream. In an embodiment, a shutterless correction may be applied to an image stream from an FIR camera, where the shutterless correction is configured to remove unwanted noise, artifacts, and the like from the received images.

At S530, the data stream is split. In an embodiment, the data stream is split into two parallel streams, a first stream and a second stream, where the first stream is fed into to a video processor and a second stream is fed into a frame buffer, as noted above. Two streams and are output by the video processor and buffer respectively and may include varying amount of data. In a further embodiment, one stream contains additional data for further processing, e.g., additional bit depth (14 bit versus 8 bit) captured from the FIR sensor.

At S540, the first stream is enhanced. The enhancement may include implementing any of, or combination of: a bilateral filter, automatic gain control, local contract enhancement, polarity-and-brightness correction, and the like, to the first stream. At S550, the second stream is buffered, so that it would be output to the matching stream such that the output of the first stream from the enhancement and the output of the second stream from the buffer match. The enhancement of S540 and the buffering of S550 are performed in parallel.

At S560, the first stream and the second stream are synchronized, such that each frame therein matches up. In an embodiment, a synchronization signal is received from the enhanced first stream indicating a particular frame within the first stream, where the synchronization signal allows for the enhanced first stream and the buffered second stream to be synchronized.

It should be noted that the embodiments discussed herein have been presented with reference to a specific implementation where two streams are output and synchronized. However, the disclosed embodiments may be utilized to provide an FIR camera that generates more than two thermal streams as a synchronized output that may be fed to an external computer in synchronized manner.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for synchronizing a plurality of image streams output by a shutterless far-infrared (FIR) camera, comprising:
    applying an initial correction to a received image stream, and removing fixed noise patterns from the received image stream to obtain corrected image stream, wherein the received image stream is captured by the shutterless FIR camera;
    splitting the corrected image stream into a first image stream and at least a second image stream;
    enhancing the first image stream by at least one image enhancing process;
    buffering the second image stream until a synchronization signal is received; and
    synchronizing the first image stream and second image stream, such that output of the enhanced first image stream and the buffered second image stream match, wherein the initial correction includes at least a shutterless image correction that is applied to the received image stream.

2. The method of claim 1, wherein the first image stream is fed into a video processor configured to enhance the first image stream, and the second image stream is fed into a frame buffer configured to buffer the second image stream.

3. The method of claim 2, further comprising: assigning the synchronization signal to a certain frame within the first image stream, and, when the synchronization signal is detected, releasing the at least a second image stream from the frame buffer at a matching frame.

4. The method of claim 1, wherein the at least one image enhancing process includes any one of: a bilateral filter, automatic gain control, local contract enhancement, and polarity-and-brightness correction.

5. The method of claim 1, wherein the at least one image enhancing process is directed to enhance the first image stream for use in advanced driver assistance (ADA) applications.

6. The method of claim 1, further comprising: combining both image streams into to a single virtual stream.

7. The method of claim 1, further comprising:
outputting the synchronized first image stream and second image stream to an external computing unit for further image processing.

8. The method of claim 7, wherein the further image processing includes at least one of: object detection, road classification, and area of interest identification.

9. The method of claim 1, wherein the received image stream is a thermal video stream.

10. The method of claim 1, wherein the first image stream is an 8-bit data stream, and the second image stream is a 14-bit image stream.

11. A shutterless far-infrared (FIR) camera, comprising:
an FIR sensor;
an optical unit; and
an integrated circuit (IC), wherein the IC further comprises: a processing circuitry, a shutterless correction processor (SLCP) and an image enhancing processor (IEP);
wherein the SLCP is configured to:
apply a flat-field correction without a shutter; and
execute a shutterless correction to a received image stream, and remove fixed noise patterns from the received image stream to obtain corrected image stream, wherein the received image stream is captured by the shutterless FIR camera;
wherein the IC is configured to:
split the corrected image stream into a first image stream and at least a second image stream;
wherein the IEP is configured to:
enhance a received first image stream by at least one image enhancing process;
buffering the second image stream until a synchronization signal is received; and assign
a synchronization signal to a frame within the first image stream, such that output of the enhanced first image stream and the buffered second image stream match.

12. The FIR camera of claim 11, wherein the at least one image enhancing process includes any one of: a bilateral filter, automatic gain control, local contract enhancement, and polarity-and-brightness correction.

13. The FIR camera of claim 11, further comprising a frame buffer configured to buffer a second image stream until the synchronization signal is received, and release the second image stream when the synchronization signal is received such that the first image stream and second image stream match up.

14. The FIR camera of claim 11, further comprising a synchronization logic configured to synchronize the first image stream with a second image stream when the synchronization signal is received to create a single virtual stream.

15. A non-transitory computer readable medium having stored thereon instructions for causing a processing circuitry to perform the method of claim 1.

* * * * *